Patented June 2, 1931

1,807,693

UNITED STATES PATENT OFFICE

GEORG KALISCHER AND HEINZ SCHEYER, OF FRANKFORT-ON-THE-MAIN, AND KARL KELLER, OF MAINKUR, NEAR FRANKFORT-ON-THE-MAIN, GERMANY, ASSIGNORS TO GENERAL ANILINE WORKS, INC., OF NEW YORK, N. Y., A CORPORATION OF DELAWARE

PROCESS FOR INTRODUCING AN ALDEHYDIC GROUP INTO CYCLIC COMPOUNDS

No Drawing. Application filed January 30, 1928, Serial No. 250,718, and in Germany February 2, 1927.

Our invention relates to a process for introducing an aldehydic group into carbo- and heterocyclic compounds containing a labile hydrogen atom, whereas other hydrogen atoms of the carbo- and heterocyclic compounds may be replaced by halogens or by other monovalent substituents attached to a carbon atom of the ring by means of a carbon-, oxygen- or sulfur-atom (as for instance —$CH_3$, —OH, —O-alkyl, —S-alkyl).

The process consists in acting on such cyclic compounds in presence of a condensation agent containing chlorine with a formylamino-compound of the general formula:

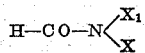

wherein $X_1$ and $X_2$ represent hydrogen or aryl, or $X_1$ represents aryl and $X_2$ represents alkyl.

Formylamino compounds of the aforesaid formula are formamide and the formyl derivatives of secondary amines; as condensation agents containing chlorine, the chlorides of phosphorus, sulfur, of their ogygen derivatives and of aluminium are especially suitable for our process.

As carbo- and heterocyclic compounds, such products are suitable for our process in which a hydrogen atom attached to a carbon atom is labilized in consequence of the characteristic molecular structure, particularly by the locating influence of a substituent present in the molecule. As compounds suitable for our process may be named for instance meta-xylene, anthracene (which is well known to have two labile hydrogen atoms in 9- and 10-position), ethylcarbazole, pyridin, quinoline, naphthostyril, anisol, α- and β-naphthol, naphtholethers, naphthalenethio-ethers, hydroxythionaphthene, phenylmethylpyrazolone and so on.

Generally speaking the reaction is carried out by allowing the formylamino compound to react with the condensing agent and then by adding to the primary reaction product thus formed the cyclic compound containing a labile hydrogen atom. Advantageously one may utilize indifferent organic solvents for diluting the mass. The reaction often occurs in the cold and may be accelerated by warming the mass. The aldehydic derivatives obtained may be isolated from the reaction mixture according to the usual methods.

The aromatic aldehydic compounds are mostly obtainable according to our process with an excellent yield and in a very pure state. They are important intermediates for the production of dyestuffs. The aldehydic derivatives, containing an anthracene nucleus, are new compounds unknown hitherto.

In order to further illustrate our invention the following examples are given, the parts being by weight and all temperatures in centigrade degrees; but we wish to be understood that our invention is not limited to the examples given, nor to the exact conditions stated therein.

Example 1

13,5 parts of formylmonomethylaniline are mixed with 15,3 parts of phosphorus oxychloride and the mixture is allowed to stand for about an hour. Then at ordinary temperature 10,8 parts of anisol are added and after standing for about an hour the mass is heated on the water-bath for some hours. After cooling down the dark colored liquor is poured on ice water and the separated oil is removed from the acid aqueous solution in the usual manner. The anis-aldehyde of the formula:

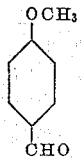

is thus obtained with an excellent yield. It may be purified by means of the bisulfite compound or by distillation. Its boiling point is 247–248°, the melting point of the aldazine 164–165° as described in literature.

Example 2

8,6 parts of β-naphtholethylether are introduced into a mixture of 13,5 parts of formylmonomethylaniline and 15,3 parts of phosphorus oxychloride. After standing for some time the mixture is heated on the water bath to about 90°. Then the dark red mass is poured on ice water and the formed 2-ethoxy-1-naphthaldehyde of the formula:

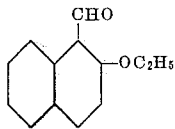

separates in a crystalline form. When recrystallized from alcohol it represents colorless needles melting at 111°, its aldazine melts at 184° (cf. Bartsch, Berichte d. deutsch. Chem. Ges. vol. 36, page 1975 and Gattermann, Liebigs Annalen, vol. 357, page 367). The yield is theoretical.

When replacing β-naphtholethylether by 8.1 parts of tetrahydro-α-naphtholmethylether an 1-methoxy-tetrahydronaphthaldehyde is obtained with an excellent yield which corresponds probably to the formula:

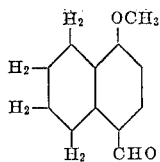

The new compound separates first in an oily state from the reaction mass, it solidifies to a crystalline mass. When recrystallized from dilute alcohol it represents colorless needles, melting at 59–60°. Its aldazine melts at 210–211°. In the same manner tetrahydro-β-naphtholmethylether yields a new 2-methoxy-tetrahydronaphthaldehyde of the probable formula:

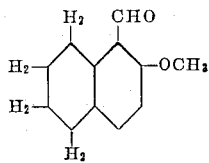

When recrystallized from dilute alcohol it represents yellowish needles melting at 52–53°. Its aldazine melts at 237–238°. The corresponding new 2-ethoxy-tetrahydronaphthaldehyde represents yellowish prisms, melting at 62–63°. The aldazine melts at 215°.

*Example 3*

13,5 parts of formylmonomethylaniline are mixed with 15,3 parts of phosphorus oxychloride and the mixture is allowed to stand for about an hour. Then at ordinary temperature 8,9 parts of anthracene are added and the reaction mass is immediately heated to about 80°. With a vivid evolution of hydrochloric acid the anthracene is gradually dissolved to a dark red solution. To complete the reaction the mass is heated for some hours on the water-bath. By pouring it on ice-water the reaction product is separated as a yellow granular precipitate. It may be isolated in the usual manner. The new 9-anthracene-aldehyde of the formula:

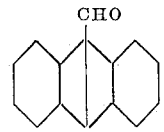

thus obtained with an almost theoretical yield, is when dry a yellow powder crystallizing from for instance glacial acetic acid as yellow crystals, melting at about 104°. It is soluble in concentrated sulfuric acid with an intense red color and yields, when treated with the reagents usual for aldehydes the corresponding derivatives, such as by the action of hydrazine an orange-yellow difficulty soluble aldazine.

When carrying out the reaction by starting from metaxylene the 1.3-dimethylbenzene-4-aldehyde is obtained, characterized by its properties described in literature.

*Example 4*

10 parts of 1-chloroanthracene (prepared e. g. according to O. Fischer and Ziegler, Journ. f. prakt. Chemie, vol. 86, page 293) are introduced into a mixture of 13,5 parts of formylmethylaniline and 15,3 parts of phosphorus oxychloride. When heating the mass to about 100° C. the chloroanthracene dissolves to a dark red solution and a vivacious evolution of hydrochloric acid occurs. After warming the mass for about 2 hours on the water-bath it is diluted with water and the yellow precipitate is filtered off and washed. When recrystallized from alcohol the new chloroanthracene-aldehyde of the formula:

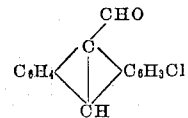

is obtained as bright brass yellow prisms, soluble in sulfuric acid with a bluish red color and melting inexactly at about 97–104°. Its aldazine represents yellow needles, difficultly soluble in glacial acetic acid, soluble in concentrated sulfuric acid with a bluish green color.

*Example 5*

13,5 parts of formylmethylaniline are mixed with 15,4 parts of phosphorus oxychloride, which react together whilst softly warming. After stirring the yellowish colored mass for some hours 25 parts of benzene are added and gradually according as solution occurs 14,4 parts of finely powdered β-naphthol are introduced while stirring and taking care, by cooling, that the temperature is about 10°. The mass is allowed to stand for about 20 hours and then it is poured on icewater. The acid solution is separated from the benzolic layer and the benzene is removed by steam distillation. From the brownish colored residue according to the usual methods for instance by steam distillation or by means of the bisulfite compound the pure 2-hydroxy-1-naphthaldehyde of the formula:

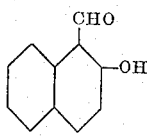

is obtained with an excellent yield, its melting point is 81–82°, that of the oxime is 157°. Also the aldazine shows the properties as described in literature. Ferric chloride produces a brownish coloration of an alcoholic solution of the aldehyde.

Instead of phosphorus oxychloride also thionyl- or sulfurylchloride or aluminiumchloride may be used as condensing agents, instead of formylmethylaniline other formylated amines such as formyldiphenylamine. A particularly good result is obtained when using formamide and aluminiumchloride. When condensed in the same manner α-naphthol yields the 4-hydroxy-1-naphthaldehyde of the properties as described in literature, 2.7-dihydroxynaphthalene yields with a good yield 2.7-dihydroxynaphthalene-1-aldehyde of the probable formula:

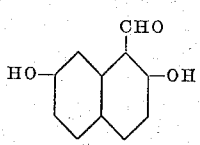

1.5-dihydroxynaphthalene the 4.8-dihydroxy-1-naphthaldehyde which seems to correspond to the formula:

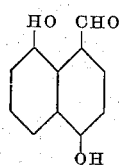

2.3-hydroxynaphthoic acid the 2-hydroxynaphthalene-3-carboxy-1-aldehyde, a yellow crystalline substance, its reddish colored aldazine melts above 300°. 2.3-hydroxynaphthoic acid anilide yields the corresponding yellowish colored aldehyde, its reddish aldazine melts above 300°.

When starting from hydroxycompounds of the benzene series the corresponding aldehydic derivatives are obtained, for instance from p-xylenol the 2.5-dimethyl-4-hydroxybenzaldehyde, from resorcinol the 2.4-dihydroxybenzaldehyde and from guiacol vanilline (3-methoxy-4-hydroxybenzaldehyde).

*Example 6*

10 parts of 4-methyl-6-chlorohydroxythionaphthene are stirred to a paste with 15 parts of formamide and to the mixture 10 parts of anhydrous aluminium chloride are added whilst the temperature raises from about 20 to 70°. The mixture is heated to 100–110° for about an hour and the brownish green colored molten mass is diluted with water, the precipitate is filtered off and extracted with boiling glacial acetic acid. By adding water to this solution the new 4-methyl-6-chlorohydroxy-oxythionaphthene-2-aldehyde corresponding probably to the formula:

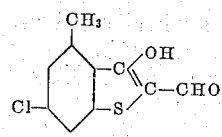

is obtained with a good yield. It represents a yellowish crystalline powder. Its aldazine has 277–278° melting point.

With the same result one may use phosphorus oxychloride as condensing agent for the process.

*Example 7*

19,4 parts of 6-ethoxy-3-hydroxythionaphthene are slowly introduced into a cold mixture of 20 parts of formamide and 31 parts of phosphorus oxychloride. The temperature rises gradually to about 20–25° and the mass turns dark brown. It is allowed to stand at ordinary temperatures for some hours; then it is diluted with icewater. The reddish colored precipitate is filtered off and extracted with boiling glacial acetic acid. If the acetic acid solution is concentrated and cooled down, the new 6-ethoxy-3-hydroxythionaphthene-2-aldehyde of the probable formula:

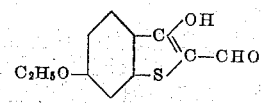

crystallizes as yellowish crystals. Its aldazine melts at 248°.

If aluminiumchloride is used as condensing agent and the reaction mass is heated for some hours to 100–110° the same aldehydic compound is obtained with a good yield.

We claim:

1. Process for introducing an aldehydic group into cyclic compounds which process comprises acting with a formylaminocompound of the general formula:

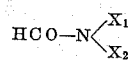

wherein $X_1$ and $X_2$ represent hydrogen or aryl or $X_1$ represents aryl and $X_2$ represents alkyl in the presence of an acid condensation agent containing chlorine on carbo- and heterocyclic compounds containing a labile hydrogen atom, and in which other hydrogen atoms may be replaced by halogen or by other monovalent substituents attached to a carbon atom of the ring by means of a carbon-, oxygen- or sulfur-atom.

2. Process for introducing an aldehydic group into cyclic compounds which process comprises acting with a formylaminocompound of the general formula:

wherein $X_1$ and $X_2$ represents hydrogen or aryl, or $X_1$ represents aryl and $X_2$ represents alkyl in the presence of an acid condensation agent containing chlorine on cyclic compounds of the anthracene series 3. As new compounds aldehydes of the anthracene series corresponding probably to the general formula:

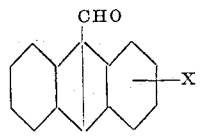

wherein X means hydrogen or a halogen, which are when dry crystalline substances, having a definite melting point, capable of the characteristic reactions of aldehydes.

4. As a new compound the anthracene-9-aldehyde of the formula:

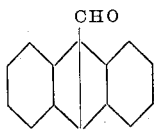

which is when dry crystalline yellow powder, melting at about 104°, soluble in the usual organic solvents and capable of the characteristic reactions of aldehydes.

In testimony whereof, we affix our signatures.

GEORG KALISCHER.
HEINZ SCHEYER.
KARL KELLER.